UNITED STATES PATENT OFFICE.

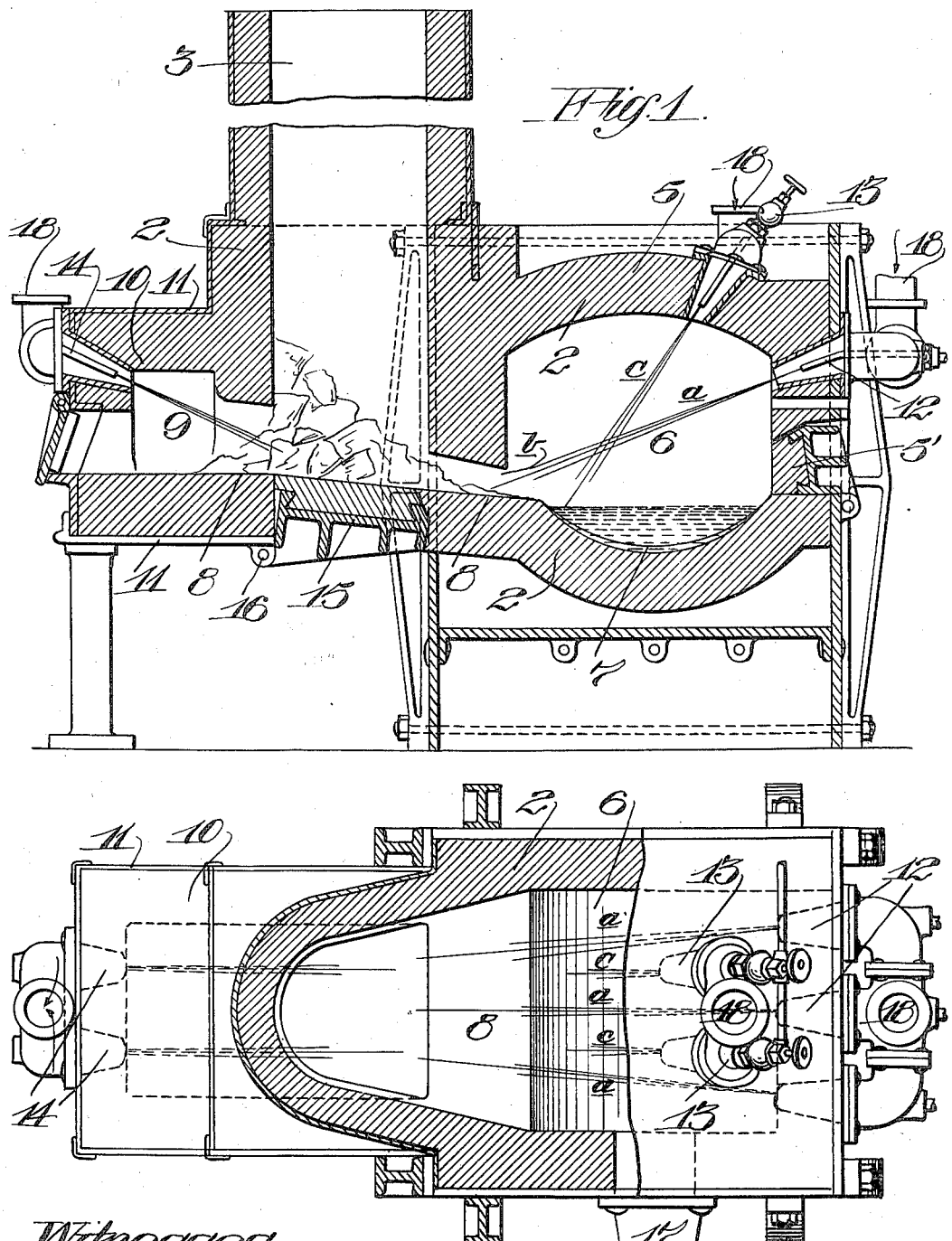

WALLACE H. DOW, OF PIEDMONT, CALIFORNIA.

SMELTING-FURNACE.

1,032,745.  Specification of Letters Patent.  Patented July 16, 1912.

Application filed February 15, 1912. Serial No. 677,816.

*To all whom it may concern:*

Be it known that I, WALLACE H. DOW, a citizen of the United States, residing at Piedmont, in the county of Alameda and State of California, have invented new and useful Improvements in Smelting-Furnaces, of which the following is a specification.

This invention relates to furnaces, and particularly to furnaces for the smelting of ore and the melting of metals by the application of heat due to the combustion of hydrocarbon in the furnace.

It is well known that in melting and smelting furnaces of the common coke burning type, the impurities in the coke and other impurities contained in the substances used in smelting and melting of metals, greatly injure the quality of the reduced metal by being retained in the molten metal during the operations of melting and smelting. Furthermore the reduction of ores and metals by melting and smelting is in many districts made quite expensive by the use of coke, and especially when in these districts crude hydrocarbons may be had in plenty, and at comparatively much less cost than coke.

It is the object of the present invention to devise and provide a furnace capable of melting and smelting ores and metals by the use of hydrocarbons, thus not only rendering the reduction much less expensive, but further obtaining a much more pure metal in the furnace.

It is a further object of the invention to provide a furnace structure of such design, proportion and structure that it may be readily charged, emptied, cleaned and tapped, and which furnace is protected by an incasement of metal properly braced to stand the strains incident to the process.

The invention consists in the whole, details of construction and combination of parts more fully hereinafter described, and which is illustrated in the drawings, in which—

Figure 1 is a longitudinal, vertical section of the furnace. Fig. 2 is a plan view partly in section of the furnace.

Many years of experience in foundry work and smelting operations have led me to observe the value and necessity of a furnace capable of reducing ores and metals to a molten state by the application of heat through the combustion of hydrocarbons. A furnace so constructed would be more easily operated due to the avoidance of shutting down operations for the charging of the furnace with coke and smelting material, for the reason that the hydrocarbon burning furnace can be started instantly by the application of the fire to ignite the hydrocarbon fed to the furnace. I have further observed that in ordinary cupola furnaces, there is a tendency of the material being handled to choke at the throat of the furnace at the bottom of the cupola, and it is one of the purposes of this invention to design and provide a cupola furnace provided with oil burning appliances for the reduction of material, the fire box of the furnace being arranged so as to avoid possibility of the material being reduced choking at one side, and by extending the furnace chamber in a peculiar manner, a most efficient reduction is obtained.

To the end of accomplishing the several purposes and of providing a furnace having the manifest advantages above stated, I have illustrated a furnace with a suitable fire resistant structure 2, vertically above which projects a cupola 3, here shown as broken away, and which is provided with a charging aperture whereby the material to be reduced may be fed to the furnace.

The furnace structure 2 is shown as extending forwardly to one side of the cupola as at 5, wherein is formed a reducing chamber 6, of suitable design and proportions, the bottom of which is shown as concaved as at 7 to form a pot for the molten metal, and rearwardly from the pot 7 there is projected and inclined upwardly a bottom 8 which passes beneath the opening of the cupola 3, and terminates in a combustion chamber 9 in the rear extension 10 of the furnace structure 2. The sides and bottom of the furnace structure are shown as incased in the metal sheeting indicated at 11, which protects the furnace structure against undue expansion and injury during operations.

The present furnace is designed especially for the reduction of material by the application of heat through the combustion of the hydrocarbon. The hydrocarbon is fed to the furnace through a plurality of burners which are arranged severally in sets, burners 12 being arranged at a suitable height in the front 5 of the furnace. Other burners 13 being arranged in the top of the front 5 of the furnace, and still other burners 14, being arranged to discharge the flame into the combustion chamber 9 of the rear of the cupola 3.

In order to obtain the maximum efficiency of the several burners 12, 13, and 14 of the furnace, not only as regards their heating effect, but also as regards their point of impingement upon the material in the furnace, the several burners are peculiarly and especially arranged with the object in view of producing and aiding the most advantageous movement of the material being operated upon. The special arrangement of the burners is well illustrated in Figs. 1 and 2, in which it will be observed that the burners 12 in the front of the furnace, are set at an incline, so that their line of flame, which is indicated by the dotted line $a$, Fig. 1, will pass across the chamber 6 and impinge upon the material in the throat $b$ of the furnace, which is closely arranged to the opening of the cupola 3, so that as the material settles in the cupola the lowermost portion of the charge is attacked by the flame represented at $a$, which thus being reduced to the molten state will gravitate down the inclined surface or bottom 8, into the pot 7. The several burners 12, are shown in plan view as converging slightly, so that their flames all strike with the utmost effect in the throat $b$. The uppermost burners 13 are located at the forward portion of the top of the furnace body 5, and are inclined downwardly and backwardly toward the rear upper edge of the metal pot 7, the purpose of the burners 13 being to attack the material moving down the lower end of the shelf or bottom 8, just as the molten material separates and runs into the pot 7. As shown in Fig. 2, the lines of movement of the flames from the burners 12, and the flames from the burners 13, do not intersect; thus flames, as $c$, coming from the burners 13, pass between the flames represented at $a$, Fig. 2. The burners 14, at the rearmost portion of the furnace discharge into the chamber 9, thus efficiently attacking and reducing the material issuing from the bottom of the cupola 3 into the rear throat $b$. It will be observed that by the present arrangement of burners, while the material in the front of the throat $b$ is being attacked by the flames represented at $a$, the rear portion of the material at the throat $b$ is attacked by the flames from the burners 14, the particular advantage and object of this being to avoid the chance of the material most distant from the front of the throat $b$ from becoming clogged, thus reducing the rapidity of operation of the furnace.

For the purpose of aiding the handling and poking of the material in the furnace, the front body 5 is provided with a door 5', which may be opened as necessary for access to the interior of the furnace, and after operations have ceased in the furnace, the cupola 3 may be cleansed from below by a door 15, pivoted at 16, so that it may be opened as occasion requires. During the operation of the furnace, melted material may be withdrawn from the chamber 6 or pot 7 by a tap hole 17, Fig. 2. Air or other medium for aiding combustion of the hydrocarbon may be admitted to the furnace through suitable air conductors or flues 18.

Having thus described my invention, what I claim and desire to secure by Letters Patent is—

1. The combination in a smelting furnace, of a charging portion, a pot communicating therewith and sets of hydrocarbon burners, one set of burners discharging substantially crosswise through the space between the discharge of adjacent burners of the other set.

2. A furnace consisting of a reducing chamber, a cupola with a floor declining and connecting with one end of the reducing chamber, and sets of burners having their axes of direction inclined at different angles with relation to the bottom of said chamber, one set of said burners discharging between those of the other set.

3. A furnace consisting of a horizontally disposed concave bottomed reducing chamber, a cupola with a floor declining to connect with that of the reducing chamber, an extension and a combustion chamber at the opposite side of the cupola from the reducing chamber, burners therein having their discharge directed toward the junction of the two chambers, and other burners in the reducing chamber, said last-named burners discharging substantially crosswise through the space between the discharges of a pair of the first-named burners, each of said burners discharging toward the mouth of said chamber.

In testimony whereof I have hereunto set my hand in the presence of two subscribing witnesses.

WALLACE H. DOW.

Witnesses:
H. A. Dow,
HERBERT P. COWLEY.